United States Patent [19]

Roalson

[11] Patent Number: 4,551,776
[45] Date of Patent: Nov. 5, 1985

[54] AUTOMATIC REFERENCE ADJUSTMENT FOR POSITION ERROR SIGNAL ON DISK FILE SERVO SYSTEM

[75] Inventor: Howard J. Roalson, Round Rock, Tex.

[73] Assignee: International Business Machines Corporation, Armonk, N.Y.

[21] Appl. No.: 451,583

[22] Filed: Dec. 20, 1982

[51] Int. Cl.$^4$ ............................................ G11B 21/10
[52] U.S. Cl. ...................................... 360/77; 318/681
[58] Field of Search .............................. 360/77, 78, 75; 369/43–46; 318/603, 677, 681; 250/201 DF, 209

[56] References Cited

U.S. PATENT DOCUMENTS

| 3,818,502 | 6/1974 | Chien et al. | 360/77 |
| 4,400,747 | 8/1983 | Siverling | 360/77 |
| 4,415,939 | 11/1983 | Ballard | 360/77 |
| 4,451,859 | 5/1984 | Noel | 360/75 |
| 4,480,217 | 10/1984 | Robbins et al. | 360/77 |

OTHER PUBLICATIONS

*IBM TDB*, vol. 18, No. 10, "Track Following Servo System", Oswald, Mar. 1976, pp. 3424–3425.
*IBM TDB*, vol. 20, No. 1, "Off-Track Gain Calibration of Position Error Signal", Palmer, Jun. 1977, pp. 349–350.
IBM Technical Disclosure Bulletin, vol. 21, No. 2, Jul. 1978–pp. 804–805, "Quad–Burst PES System for Disk File Servo"–Herrington & Mueller.

*Primary Examiner*—Raymond F. Cardillo
*Assistant Examiner*—Steven R. Garland
*Attorney, Agent, or Firm*—Walter J. Madden, Jr.; Thomas R. Berthold

[57] ABSTRACT

A servo system which generates a position error signal (PES) provides for periodically calibrating the magnitude of the PES to increase or decrease its magnitude as required by modifying the gain of a variable gain amplifier in the servo loop.

4 Claims, 6 Drawing Figures

AUTOMATIC REFERENCE ADJUSTMENT FOR POSITION ERROR SIGNAL ON DISK FILE SERVO SYSTEM

BACKGROUND OF INVENTION

1. Field of Invention

This invention relates to circuitry for use with track-seeking and track-following servo systems for magnetic disk files.

2. Description of Prior Art

A number of current magnetic disk files employ servo systems which are operable to move one or more magnetic heads from one concentric recording track to another track on a disk surface (track-seeking), and then to maintain the head or heads accurately positioned over the selected track for data operations (track-following). Such files employ some sort of recorded servo information which is read to provide signals which control the movement of the head or heads. Such recorded servo information may be in the form of sectors of servo information interspersed around the disk with data information, the sectors of servo information being read and used for track-following control during the following data information portion. Other disk files employ a separate disk surface dedicated to servo information and containing some type of recorded servo pattern which is read by a servo head to be used in generating the signals for providing the desired track-seeking and track-following control information. One such servo pattern employed is the so-called "quad burst" pattern as described in the IBM Technical Disclosure Bulletin, Vol. 21, No. 2, July 1978, pp804–5, entitled "Quad-Burst PES System for Disk File Servo" by Herrington and Mueller which is incorporated herein by reference. This servo pattern has a primary component P and a quadrature component Q in quadrature with P, and from these components four position error signals (PES) signals can be generated, PES P, PES Q, PES $\overline{P}$ and PES $\overline{Q}$ for use in controlling the servo system.

Some current disk files using this quad burst servo pattern require that a unique gain reference resistor be installed on each servo channel in the file. This must be done to achieve the required accuracy of the PES when the file is in use. Calibration requires that a special test be run, and then a fixed value resistor be selected to set a reference voltage. Once this resistor is installed, the automatic gain control (AGC) loop in the servo system adjusts the servo amplifier gain to keep the PES amplitude constant.

This approach has the disadvantage that it requires the special calibration test during manufacture, and that it does not allow any economical way to recalibrate the system when the disk file is in the field to compensate for variations with time of the circuit components.

SUMMARY OF THE INVENTION

In accordance with the present invention, circuitry is provided which will perform the above-described calibration at the time of manufacture and every time the disk file is powered on in the field.

DESCRIPTION OF THE PREFERRED EMBODIMENT

Figure 1:
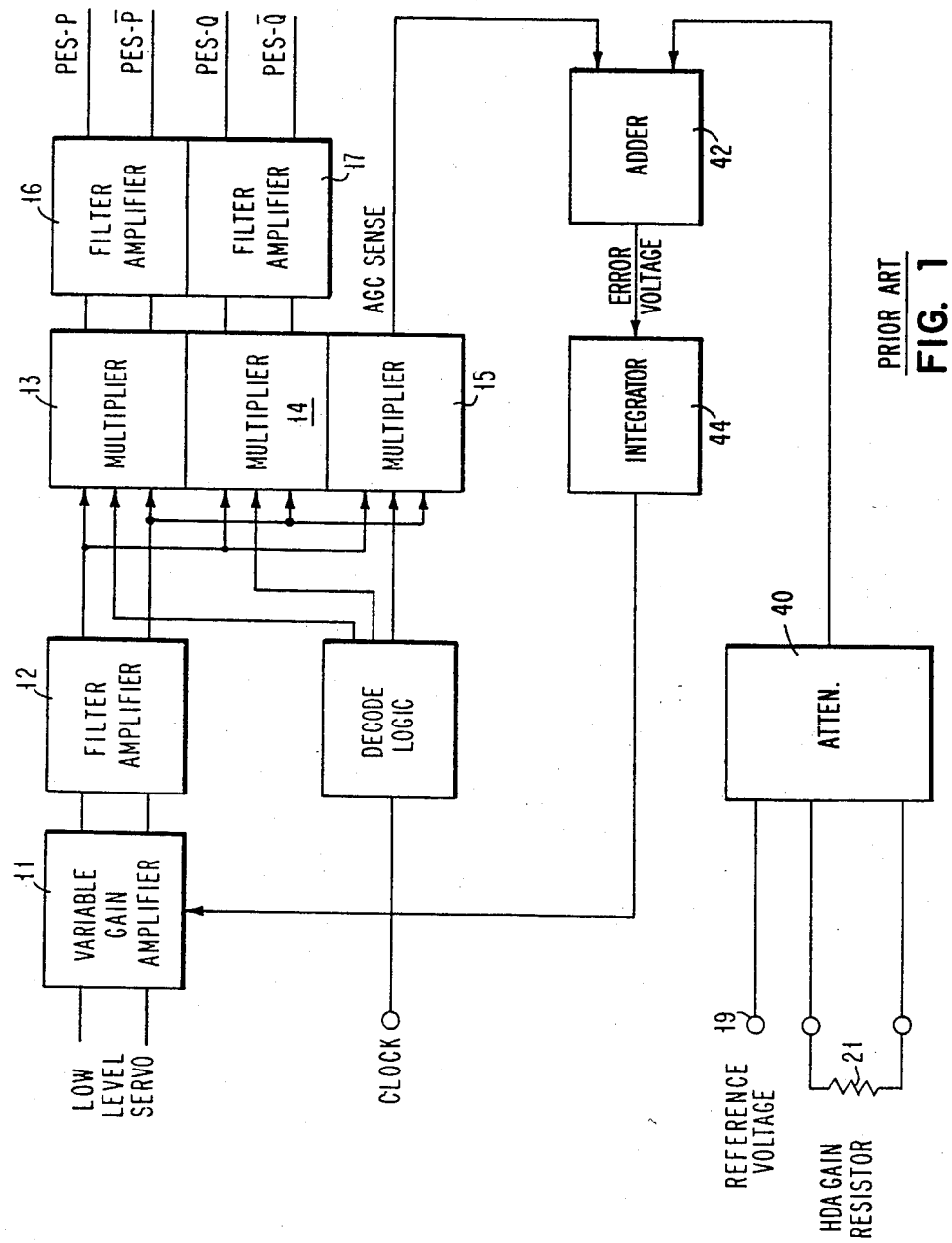
FIG. 1 is a diagram showing the prior art circuitry for calibrating quad burst circuitry.
Figure 2:
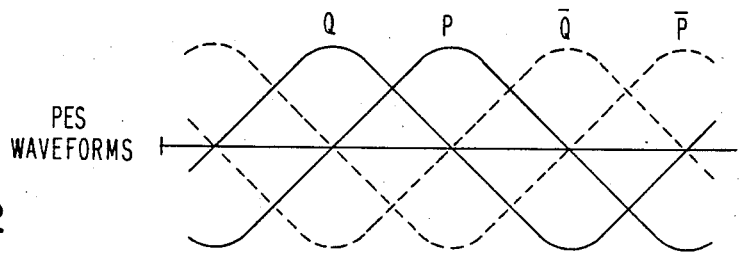
FIG. 2 contains graphs showing the shapes and phase relationships among the PES P, PES Q, PES $\overline{P}$ and PES $\overline{Q}$ signals.

FIG. 1 shows the servo circuitry used in connection with the quad burst servo pattern, as well as the prior art calibration resistor required. The circuitry includes a variable gain amplifier 11 which receives the low level servo signal from the servo head and, after amplification, supplies it through a filter amplifier 12 to multipliers 13, 14, and 15. The three multipliers are identical and operate in parallel except that the decode logic waveforms differ such that different information is decoded from the servo pattern. The outputs of multipliers 13 and 14 are supplied through filter amplifiers 16 and 17, respectively, to produce the four output signals PES P, PES Q, PES $\overline{P}$ and PES $\overline{Q}$ whose waveforms and relationships are shown in FIG. 2, and will be described below. The output of multiplier 15 is an AGC sense signal which is added algebraically to the output of the reference attenuator block 40. These two signals are of opposite polarity so that the net output of the adder 42 is zero when the system is in balance. If the AGC sense signal deviates from the correct value an error signal occurs when the signals are added and this error is then integrated by integrator 44 to change the gain control voltage to the variable gain amplifier 11. The control voltage is continuously adjusted to drive the error voltage to zero.

The amplitude relationship between the PES signals and the AGC sense signal depends upon a number of factors that vary from device to device and, therefore, it is necessary to uniquely calibrate each servo system as it is built. The calibration resistor required by this prior art is identified at 21.

As shown in FIG. 2, the PES waveforms generated from the quad burst servo pattern are very linear with respect to position, except near the peaks.

Figure 3:
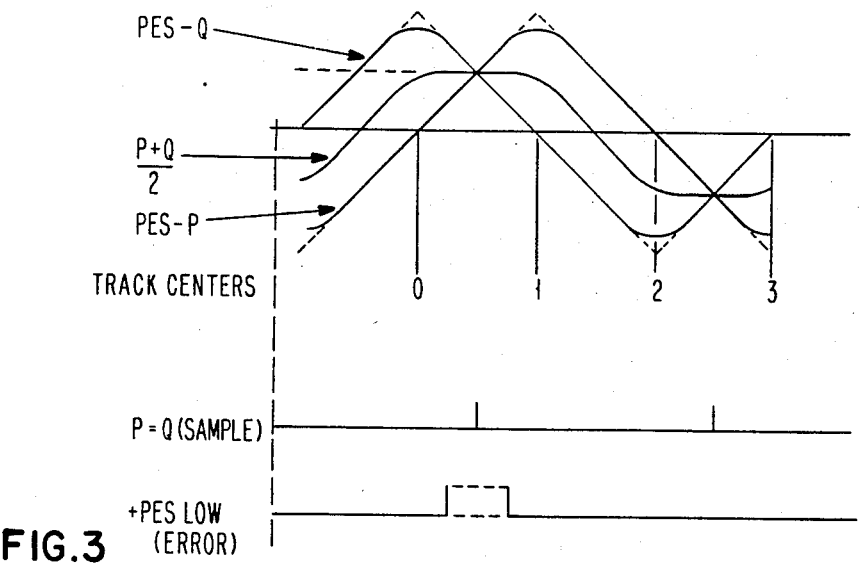
FIGS. 3 and 4 contain graphs showing various relationships among different combinations of the PES signals.

The average of two PES signals, as can be seen from the plot of "(P+Q)/2" in FIG. 3, has a uniformly flat top portion that accurately represents the magnitude of the linear portion of PES P and PES Q. The amplitude of that signal at the time where the two PES signals are equal can then be compared to a precision voltage reference to determine whether the amplitude is too high or too low.

Figure 4:
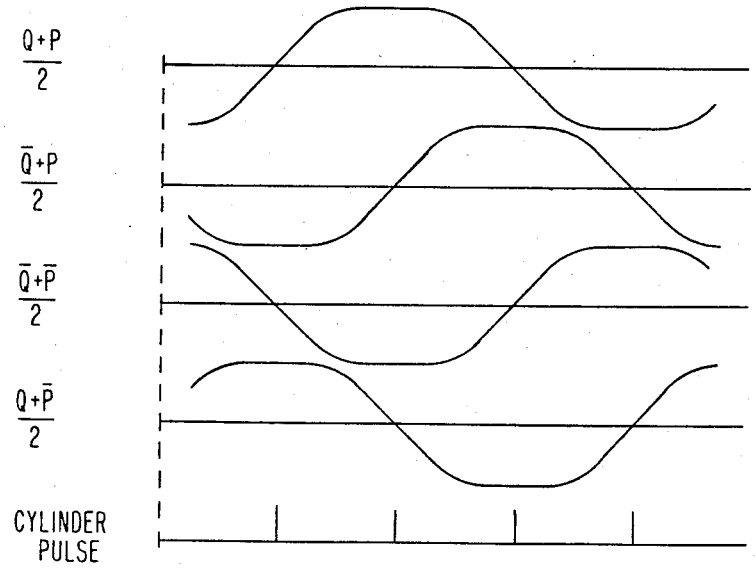

Since the inverse of both PES P and PES Q are available, it is possible to produce four signals that represent the PES amplitude as shown in FIG. 4. Each of the four combination signals can be continuously compared with a precision reference. Each time the cylinder pulse occurs the comparator outputs will be sampled and the counter will be incremented or decremented to change the value of the reference voltage to the AGC circuitry. There is no need to select one of the four comparisons over the others since only one can detect a high level at any particular sample. The sample time occurs at the track crossing. When this comparison is performed a sufficient number of times the reference will converge to the correct gain value. This calibration technique eliminates the need for a gain resistor.

The calibration of PES amplitude can be performed during "rezero". This is a warm-up routine during which the surface is scanned at low velocity, producing a sufficiently long train of PES cycles to allow the gain correction function to be performed.

Implementation

Figure 5:
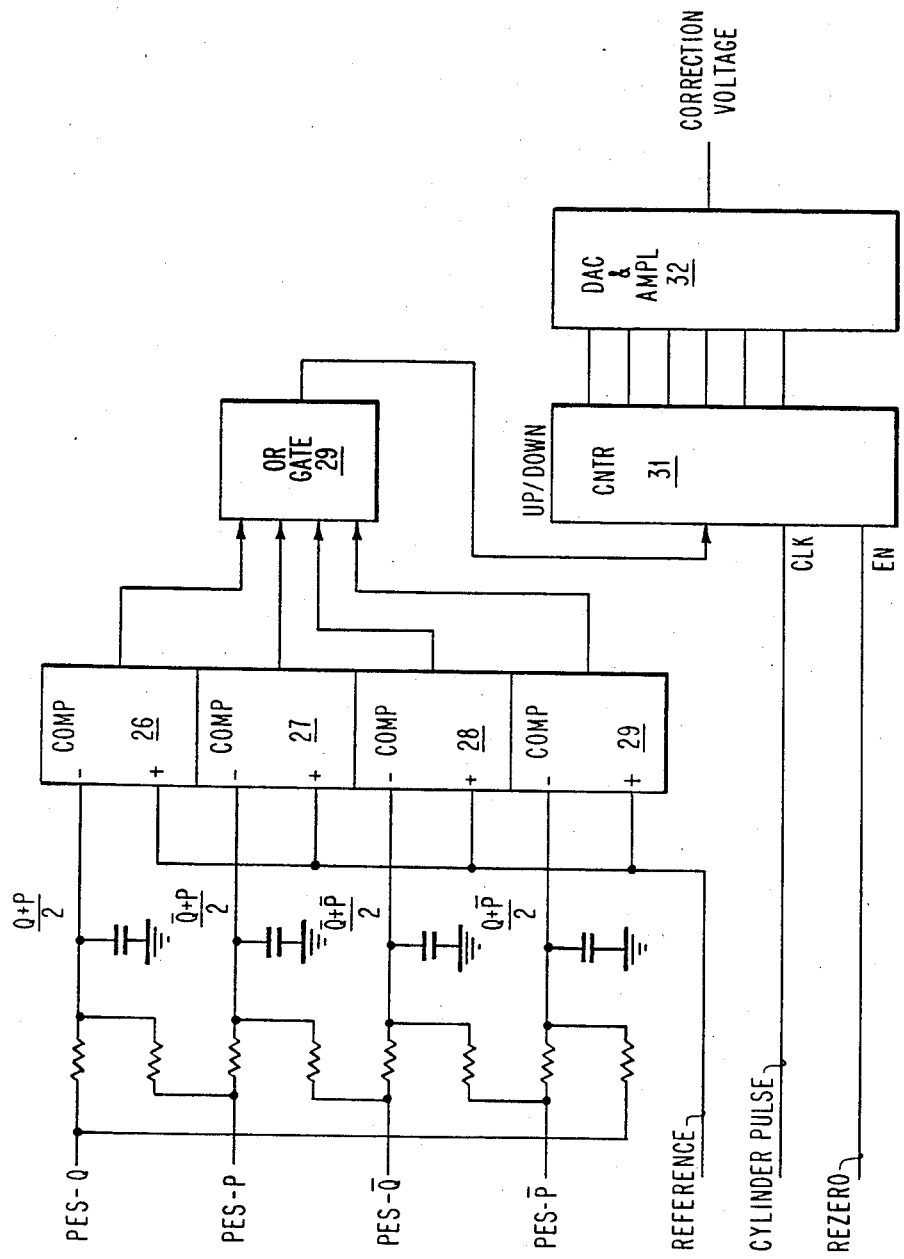
FIG. 5 shows correction circuitry for carrying out the present invention.
Figure 6:
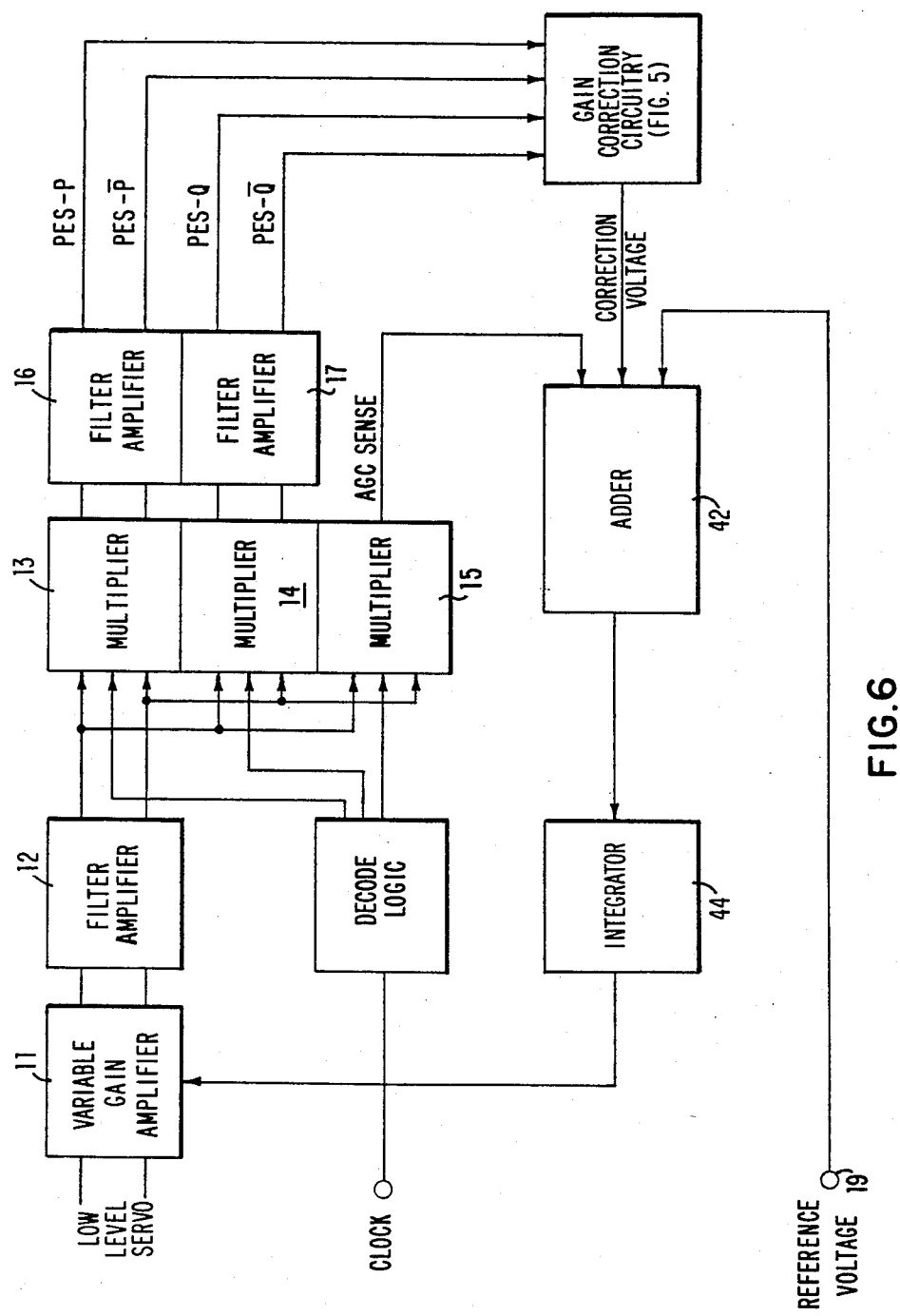
FIG. 6 shows the overall servo circuitry incorporating the correction circuitry of FIG. 5.

As shown in FIG. 5, the hardware required to build this control function consists of four comparators 26, 27, 28 and 29, and "OR" gate 44, an up/down counter 31, a digital-to-analog converter (DAC) 32, Operational Amplifier 18 (from FIG. 1), and several resistors and capacitors. The four combination signals are derived from the four PES signals with simple R-C filters and feed individually to the four comparators. The common reference to all comparators is the precision voltage that represents the correct amplitude. If the signal to a comparator exceeds the reference level then its output will go to a "high" state. The four comparator outputs can be logically OR'd together to produce a single logic level that describes the accuracy of the PES amplitude. The four comparator signals never "interfere" with each other since only one can be high at any particular time. A logic signal is already available called "cylinder pulse" that consists of a narrow pulse at each track crossing as shown in FIG. 4. This pulse can be used to step a counter either up or down each time a track crossing occurs. If any comparator level is high at the time the cylinder pulse occurs then the amplitude of one of the combination waveform is too high and thus the counter must be decremented to reduce the reference voltage to the AGC circuitry. If none of the comparator levels is high then the counter should be incremented to increase the AGC reference. The gain control voltage generated by this system is only a portion of the overall gain reference voltage, since the range need only be sufficient to compensate for the mismatch between the PES waveforms and the AGC sense level.

The up/down counter 31 can be set to any value when power is initially applied. Then, near the end of the warm-up period, the gain correction circuitry would be enabled during a constant, low velocity scan of the surface (rezero). The counter would count once for each track crossing. With an eight-bit counter initially set to zero, it would then take only 256 tracks to reach its maximum count. If desired, the gain could also be recalibrated at times other than warm-up.

This solution to the calibration problem is straightforward and relatively inexpensive. It puts a control loop around all of the components that generate the position error signals. This not only improves accuracy, but relaxes some of the tolerances of the components in the AGC loop.

This invention can also be applied to the general case of any pair of signals generated in quadrature where the amplitude must be either sensed or controlled. It can apply to either triangular or sinusoidal waveforms.

I claim:

1. A system for automatically calibrating servo circuitry used with a servo pattern in which a position error signal (PES) is generated, said servo circuitry including a variable gain amplifier involved in generating said PES, said servo pattern having a primary signal P and a quadrature signal component Q in quadrature with said primary signal, said P and said Q signals having linear portions except near their peaks, a signal representing the sum of said P and said Q signals having a flat portion corresponding to said linear portions of said P and said Q signal, comprising means for generating a $\overline{P}$ signal and a $\overline{Q}$ signal, means for separately, averaging the following combinations of said signals $$P+Q, P+\overline{Q}, \overline{P}+Q, \overline{P}+\overline{Q}$$

means for comparing the amplitudes of said averaged signals with a first reference voltage, and means responsive to the results of said comparison for modifying the gain of said amplifier to change said PES.

2. A system in accordance with claim 1 in which said means responsive to the results of said comparison includes an up-down counter to generate a correcting voltage for modifying said amplifier gain.

3. A system in accordance with claim 2 in which said correcting voltage is added to the reference voltage to modify said amplifier gain.

4. A system in accordance with claim 3 in which said servo circuitry is employed in a magnetic disk file having at least one magnetic head movable to different concentric recording tracks of a magnetic disk, including means responsive to said head moving from one of said tracks to another for gating said up-down counter.

* * * * *